United States Patent [19]

Opower

[11] Patent Number: 4,930,138
[45] Date of Patent: May 29, 1990

[54] WAVEGUIDE LASER SYSTEM

[75] Inventor: Hans Opower, Krailling, Fed. Rep. of Germany

[73] Assignee: Deutsche Forschungsanstalt fuer Luft- und Raumfahrt, Bonn, Fed. Rep. of Germany

[21] Appl. No.: 399,030

[22] Filed: Aug. 24, 1989

[30] Foreign Application Priority Data

Aug. 26, 1988 [DE] Fed. Rep. of Germany ....... 3828952

[51] Int. Cl.$^5$ ............................................... H01S 3/08
[52] U.S. Cl. ........................................ 372/95; 372/92; 372/99
[58] Field of Search ......................... 372/95, 92, 93, 99

[56] References Cited

U.S. PATENT DOCUMENTS

| | | | |
|---|---|---|---|
| 4,300,106 | 11/1981 | Hohl et al. | 372/73 |
| 4,429,398 | 1/1984 | Chenausky et al. | 372/64 |
| 4,477,909 | 10/1984 | Salvi et al. | 372/95 |
| 4,498,051 | 2/1985 | Hunter et al. | 372/95 |
| 4,719,639 | 1/1988 | Tulip | 372/66 |

FOREIGN PATENT DOCUMENTS 3728129 3/1988 Fed. Rep. of Germany ........ 372/95

*Primary Examiner*—Léon Scott, Jr.
*Attorney, Agent, or Firm*—Barry R. Lipsitz

[57] ABSTRACT

In order to improve an electrically excited, diffusion-cooled laser system comprising two wall surfaces slightly spaced from one another and forming an optical waveguide, the width of the wall surfaces being a multiple of the space between them and the surfaces enclosing between them a flow-free discharge chamber, and also comprising an optically unstable resonator having a resonator beam path travelling through at least part of the discharge chamber and extending lengthwise of a resonator axis as well as having an expansion transverse to the resonator axis extending as far as at least one laser beam exiting from the resonator, this transverse expansion extending transversely to a longitudinal direction of said waveguide and approximately parallel to said wall surfaces, such that the waveguide can be constructed with as large a surface area as possible without losing the beam quality of the beam exiting the waveguide, it is suggested that the resonator be followed by a laser amplifier, the amplifier beam path thereof travelling through an additional part of said discharge chamber.

34 Claims, 5 Drawing Sheets

WAVEGUIDE LASER SYSTEM

The invention relates to an electrically excited, diffusion-cooled laser system comprising two wall surfaces slightly spaced from one another and forming an optical waveguide, the width of the wall surfaces being a multiple of the space between them and the surfaces enclosing between them a flow-free discharge chamber, and also comprising an optically unstable resonator having a resonator beam path travelling through at least part of the discharge chamber and extending lengthwise of a resonator axis as well as having an expansion transverse to the resonator axis extending as far as at least one laser beam exiting from the resonator, this transverse expansion extending transversely to a longitudinal direction of the waveguide and approximately parallel to the wall surfaces.

U.S. Pat. No. 4,719,639 discloses a laser system, in which the resonator beam path passes completely through a discharge chamber disposed between the wall surfaces of the waveguide. The resonator is, in this case, an unsymmetrical unstable resonator having spherical mirrors and its resonator beam path extends beyond the waveguide laterally and also at its ends.

Since, in the case of diffusion-cooled waveguide lasers, the energy of the beam exiting the laser is dependent on the effectively utilized area of the waveguide, relative to its wall surfaces, and the waveguide cannot be optionally increased in size in the longitudinal direction, the aim is to construct the waveguide so that it is as broad as possible and to take advantage of this. When using the unsymmetrical, unstable resonator with spherical mirrors known from U.S. Pat. No. 4,719,639, the length and breadth of the discharge chamber through which the resonator beam path passes and which is therefore utilized and also the effectively useable area of the waveguide are restricted by the curvature of the mirrors since a satisfactory beam quality of the laser beam can no longer be obtained when the length and/or breadth are too great.

The object underlying the invention is therefore to improve a laser system of the type in question such that the waveguide can be constructed with as large a surface area as possible without losing the beam quality of the beam exiting the waveguide.

This object is accomplished in accordance with the invention in that a laser amplifier is associated with the resonator, the beam path of this laser amplifier passing through an additional part of the discharge chamber.

The core of the present invention is therefore that the discharge chamber available between the wall surfaces of the waveguide is not penetrated exclusively by the resonator beam path but is divided so that only one part thereof is penetrated by the resonator beam path and an additional part of the discharge chamber serves to amplify the laser beam exiting from the resonator. This means that without increasing the volume of the discharge chamber taken up by the resonator the waveguide can be operated with a larger discharge chamber, in particular a greater utilized surface area, and, consequently, de-excitation occurring outside the resonator then takes place in the discharge chamber due to the laser beam passing therethrough and so this can contribute to amplifying the laser beam in exactly the same way as in the resonator.

In order not to lose the favourable beam guiding properties of the waveguide in its longitudinal direction in the inventive laser system, it has proven advantageous for the resonator beam path and the amplifier beam path, together, to have a transverse expansion which corresponds at the most to the width of the wall surfaces, i.e. that both the resonator beam path and the amplifier beam path do not extend laterally beyond the wall surfaces of the waveguide and, consequently, the beam guiding propertes of the waveguide are available along the entire beam path in the longitudinal direction of the waveguide.

It has proven even more advantageous for the resonator beam path and the amplifier beam path to be located completely within the discharge chamber, i.e. they do not extend beyond the ends of the waveguide either.

To exploit the available discharge chamber, it is particularly favourable for the amplifier beam path to have a transverse expansion extending transversely to the incoming laser beam and approximately parallel to the wall surfaces of the waveguide such that almost any optional breadth of the waveguide can be covered with the amplifier beam path.

This may be achieved with any optional means altering the direction of the laser beam, for example by interrupting the laser beam. It has proven to be an expedient solution, however, for the laser amplifier to have an optical means continuously reflecting the laser beam with a transverse component.

This reflecting optical means may be realized in a particularly expedient manner when it has an amplifier beam path similar to the beam path of an unstable resonator.

No exact details have so far been given concerning the arrangement of resonator and laser amplifier. In a preferred embodiment, for example, it is favourable for the resonator and the laser amplifier to be arranged side by side.

In another preferred embodiment it is expedient to have the resonator and the laser amplifier arranged in series in the longitudinal direction of the waveguide.

In a preferred arrangement of laser amplifier and resonator relative to each other, the laser amplifier has an optical axis extending parallel to the longitudinal direction of the waveguide.

In a particularly expedient arrangement of laser amplifier and resonator relative to one another, the laser amplifier has an optical axis which is parallel to the resonator axis.

With the series arrangement, in particular, it has proven favourable for the optical axis of the laser amplifier and the resonator axis to be arranged coaxially to one another.

In the embodiments described above, no details have been given as to how an amplifier laser beam exiting from the laser amplifier leaves the amplifier relative to the amplifier beam path. Particularly suitable geometries of the amplifier beam path and, in particular, an especially good beam quality of the amplifier laser beam may be achieved when an amplifier beam exiting the laser amplifier extends parallel, in particularly coaxially, to the optical axis of the amplifier.

No details have been given in the embodiments described so far concerning the design of the resonator as such. In this respect, it is expedient for the resonator to be a confocal resonator in order to obtain a laser beam exiting parallel to the resonator axis.

Moreover, it is particularly favourable for the resonator beam path to have outer beams extending parallel to one another so that they can extend either along side edges of the waveguide or at a constant distance from the side edges of the waveguide.

With regard to the arrangement of the resonator axis relative to the waveguide, it has proven very favourable to have the resonator axis extending in the longitudinal direction of the waveguide.

Insofar as the design of the optically unstable resonator is concerned, U.S. Pat. No. 4,719,639 merely discloses an asymmetric unstable resonator. In order to utilize the width of the waveguide to an optimum it has proven expedient for the resonator to be a resonator symmetrical to the resonator axis. This may be constructed to have double the width of an asymmetric resonator without forfeiting any of the quality of the exiting laser beams but does have the disadvantage that two laser beams exit from the resonator at opposite sides thereof.

It has proven expedient, in particular, for the last embodiment of a symmetrical resonator, in which the waveguide may be constructed with an adequate width, for the resonator beam path to extend at the most over the width of the waveguide.

Especially when using a resonator which is symmetrical to the resonator axis and has two exiting laser beams, considerable advantages are offered when the laser amplifier is provided with an optical means combining two parallel laser beams to form a single amplifier laser beam. Apart from an improved use of the entire discharge chamber of the laser amplifier, this also offers the possibility of recompensating for the disadvantage of a resonator symmetrical to the resonator axis.

In this connection it is also very advantageous for the amplifier beam path to comprise outer beams extending parallel to one another.

Finally, the width of the waveguide may be optimally utilized by the laser amplifier when the amplifier beam path extends at the most over the width of the waveguide.

No comments have so far been made regarding the design of the mirrors for the laser amplifier. In conjunction with the waveguide laser and a beam path which is as favourable as possible and adaptable to the waveguide, it is, however, expedient for the laser amplifier to comprise confocal mirrors.

Alternatively, it is advantageous in a variation of this embodiment for the laser amplifier to comprise mirrors having wedge-shaped mirror surfaces, whereby the mirror surfaces of the respective mirrors which face one another preferably extend parallel to one another.

In the inventive laser system it is essential for the resonator beam path and the amplifier beam path to be optimally adaptable to one another to avoid any losses during transition from the resonator to the laser amplifier. For this reason, in an advantageous embodiment of the inventive laser system the resonator and the laser amplifier comprise mirors having identically curved mirror surfaces. This means that when these are also arranged confocally to one another, a similar beam path can at least be attained both in the resonator and in the laser amplifier.

With regard to the design of the mirrors it has proven expedient for the mirrors of the resonator to have mirror surfaces extending at right angles to the wall surfaces contiguous thereto. Moreover, it is also expedient for the mirrors of the laser amplifier to extend at right angles to the wall surfaces contiguous thereto. A particularly simple embodiment of the inventive laser system can be produced when the mirrors of the resonator and the laser amplifier have cylindrical mirror surfaces.

In order to obtain a type of construction for the inventive laser system which is as compact as possible it is of advantage for the mirrors of the resonator and the laser amplifier to close the waveguide.

No details have been in the embodiments described so far concerning the design of the waveguide. For example, the waveguide can have wall surfaces which are curved transversely to the longitudinal direction and which, in the extreme case, can form a ring. In a particularly simple embodiment, the waveguide is a strip-like waveguide having straight wall surfaces extending transversely to the longitudinal direction.

In contrast to conventional high-power lasers, the inventive laser system may be constructed such that the waveguide is curved in the longitudinal direction and, in the extreme case, forms a closed circle.

Alternatively, it is also conceivable for the waveguide to be angled in the longitudinal direction. In this case, in particular in the inventive laser system, the waveguide may comprise at least two waveguide portions, one waveguide portion accommodating the resonator and the other the laser amplifier.

In accordance with the embodiment described above, a waveguide may be angled once or a number of times. However, it is in any case expedient for at least one deflecting member to be provided between waveguide portions extending in a straight line in the longitudinal direction.

In this way, the waveguide portions may, for example, be arranged parallel to one another and coupled, for example, by two deflecting members.

Moreover, no details have been given concerning the design of the wall surfaces. It is, for example, possible for the wall surfaces to be made of metal and therefore form, themselves, the electrodes for a gas discharge to be generated in the discharge chamber. Alternatively, it is also conceivable for the wall surfaces to be produced from a dielectric and to bear plate-like electrodes on their outer sides which may, in addition, be segmented.

Since an essential advantage of the inventive laser system is to be seen in its compact type of construction, contingent on the diffusion cooling, it is expedient for the walls comprising the wall surfaces to be penetrated by cooling channels.

Since the amplifier laser beam exiting the inventive laser system normally has a rectangular cross section, it is expedient for the amplifier laser beam to be expanded by a cylindrical optical means to form a beam of rays symmetrical on all sides as this may then be point-focused in the following optical means in a simple manner.

Additional features and advantages of the present invention are the subject matter of the following description as well as the drawings of several embodiments.

Figure 1:
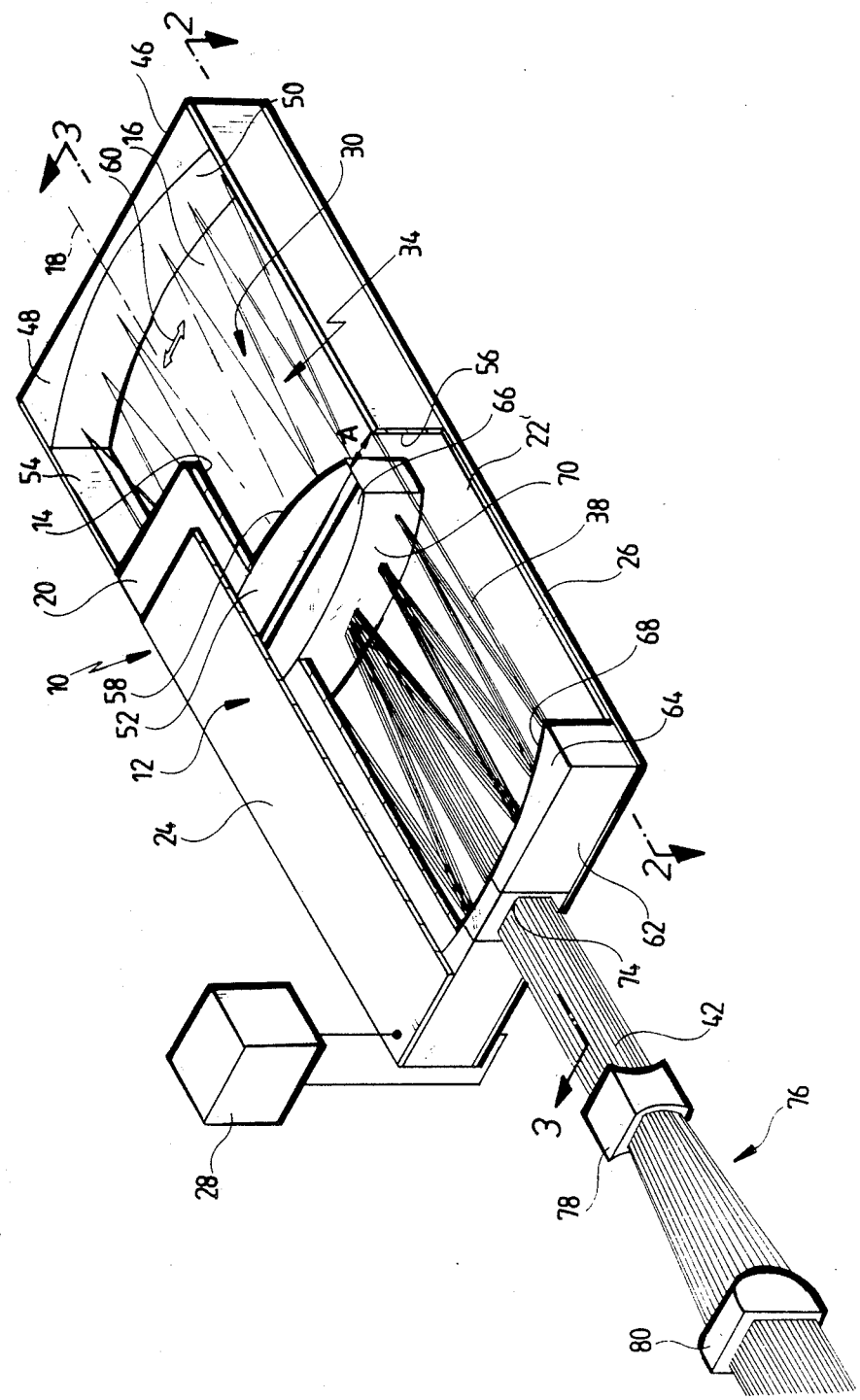
FIG. 1 is a perspective, partially opened view of a first embodiment.

A first embodiment of the inventive laser system, designated as a whole as 10, shows a plane waveguide designated as a whole as 12 which comprises an upper wall surface 14 extending in a plane and a lower wall surface 16 extending parallel to the upper wall surface at a slight distance therefrom. These wall surfaces are normally arranged at a distance of 1 to 3 mm from one another. The waveguide 12 hereby extends in the direction of a longitudinal axis 18 and the width therefore transverse to this longitudinal axis 18 is a multiple of the distance between the upper wall surface 14 and the lower wall surface 16. Both the upper wall surface 14 and the lower wall surface 16 each form the inside of an upper wall 20 or a lower wall 22 and are designed to reflect a laser beam to be generated.

The upper wall 20 and the lower wall 22 are, for their part, produced either from metal or from a dielectric material. In the latter case, they bear metal electrodes 24, 26 arranged on the opposite side to their respective wall surfaces 14, 16, i.e. on their outsides. These metal electrodes are connected to a high-frequency generator 28. When a high frequency is applied in the range of MHz to several GHz, in particular in the range of 80 to 400 MHz, a gas discharge occurs in a discharge chamber 30 located between the upper wall surface 14 and the lower wall surface 16 and filled with laser gas. In this respect, the laser gas used is CO or $CO_2$, in particular $CO_2$ with He, $N_2$ in customary mixture ratios and, advantageously, with a small porportion of Xe in addition. The walls 20, 22 are cooled via cooling channels 23.

Figures 2, 3:
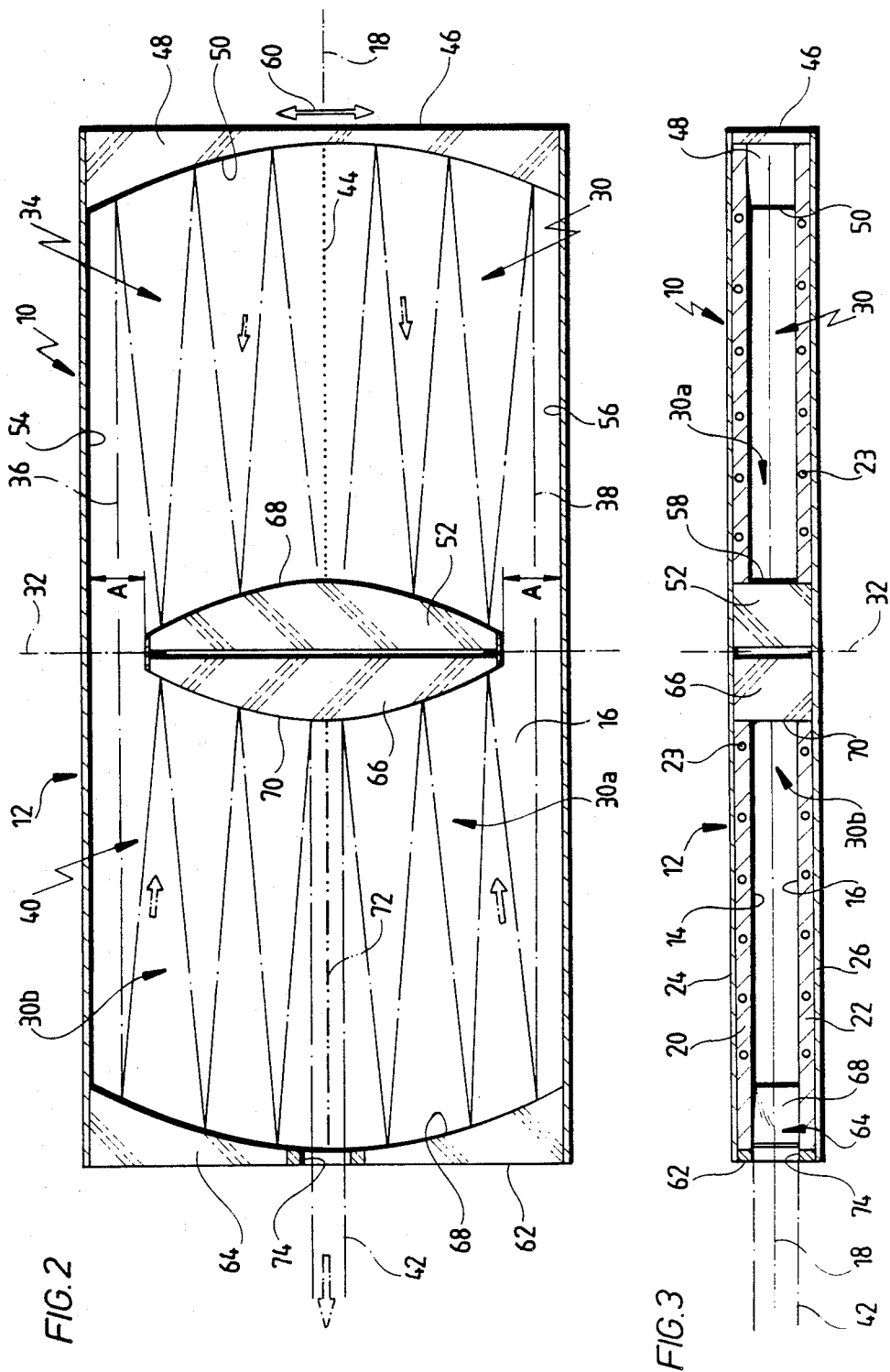
FIG. 2 is a section along line 2—2 in FIG. 1.
FIG. 3 is a section along line 3—3 in FIG. 1.

As illustrated in FIGS. 1 to 3, the waveguide 12 is divided into two halves by a central plane 32 extending at right angles to the longitudinal axis 18 and the wall surfaces 14, 16, the two halves being arranged one behind the other in the direction of the longitudinal axis 18. One half 30a of the discharge chamber serves to generate laser beams 36, 38 in conjunction with a resonator designated as a whole as 34. The laser beams leave this part 30a of the discharge chamber through the central plane 32, pass into the part 30b of the discharge chamber 30 where they are amplified by a laser amplifier designated as a whole as 40 to form an amplifier laser beam 42 exiting from this amplifier.

The resonator 34 is designed as a confocal resonator which comprises an optical axis 44 designated as resonator axis which extends parallel to the longitudinal axis 18 of the waveguide 12 and through the center of the waveguide 12. The resonator 34 comprises, in detail, a concave laser mirror 48 located at the rear end 46 of the waveguide 12 and extending substantially over its entire width. This laser mirror has a cylindrical mirror surface 50 which extends at right angles to the wall surfaces 14, 16 and also at right angles to the resonator axis 44 at the point of intersection therewith. This concave laser mirror 48 serves to close the waveguide 12 at its rear end 46.

A convex laser mirror 52 is arranged opposite the concave laser mirror 48 in the region of the central plane 32. This laser mirror does not extend over the entire width of the waveguide 12 but ends on both sides at a distance A from a right-hand side edge 54 and a left-hand side edge 56 of the waveguide 12. The convex laser mirror is also provided with a cylindrical mirror surface 58 which extends at right angles to the wall surfaces 14, 16 and also at right angles to the resonator axis 44 at the point of intersection therewith.

The focus of the two laser mirrors 48, 52 is hereby located on a side of the central plane 32 remote from the resonator 34.

A symmetrical confocal resonator 34 of this type has a beam path which begins in the region of the resonator axis and extends in transverse direction 60 thereto as far as the right-hand laser beam 36 located to the right of the resonator axis 44 and the left-hand laser beam 38 located to the left of the resonator axis 44. Both the right-hand laser beam 36 and the left-hand laser beam 38 extend parallel to the right-hand and left-hand side edges 54 and 56, respectively, so that the beam path of the resonator 34 extends at the most as far as the right-hand or left-hand side edges 54 and 56, respectively.

In view of the distance A between the convex laser mirror 52 and the side edges 54 and 56, respectively, these two laser beams now have the possibility of passing through the central plane 32 and reaching the laser amplifier 40.

This laser amplifier 40 comprises a concave amplifier mirror 64 arranged in the region of a front end 62. This mirror extends substantially over the entire width of the waveguide 12. Opposite thereto, a convex amplifier mirror 66 is arranged in the region of the central plane 32 back-to-back with the convex laser mirror 52. This mirror 66 is spaced from the right-hand and left-hand side edges 54 and 56, respectively, by a distance A, in the same way as the convex laser mirror 52. Both the concave amplifier mirror 64 and the convex amplifier mirror 66 are arranged confocally to one another and both have cylindrical mirror surfaces 68 and 70, respectively, which extend at right angles to the wall surfaces 14, 16. The focus of the two amplifier mirrors 64, 66 is located on the side of the central plane 32 remote from the laser amplifier 40. In addition, the two amplifier mirrors 64, 66 are arranged such that they are symmetrical to an optical axis 72 of the laser amplifier 40. The optical axis 72 extends coaxially to the resonator axis 44 and so the resonator 34 and the laser amplifier 40 have a common optical axis.

Moreover, the curvature of the mirror surfaces 50 and 58 as well as 68 and 70 is identical. This means that an optical means of the laser amplifier 40, formed by the amplifier mirrors 64 and 66, has an amplifier beam path which is identical to the beam path of the resonator 34 with respect to its geometry but with the one difference that in the laser amplifier 40 the two incoming laser beams 36 and 38 are reflected towards the optical axis 72 so that the amplifier laser beam 42 is coaxial to the optical axis 72. To enable this beam to exit from the amplifier 40 the concave amplifier mirror 64 is provided with a central opening 74, the width of which is smaller than 2A and larger than A and the height of which corresponds to the distance of the wall surfaces 14, 16 from one another.

In this way the amplifier laser beam 42 can exit from the front end 62 of the waveguide 12 and is subsequently expanded by a cylindrical optical means 76, comprising a cylindrical dispersing lens 78 followed by a cylindrical converging lens 80, to form a beam which is symmetrical on all sides and can be subsequently focused in a simple manner.

Figure 4:
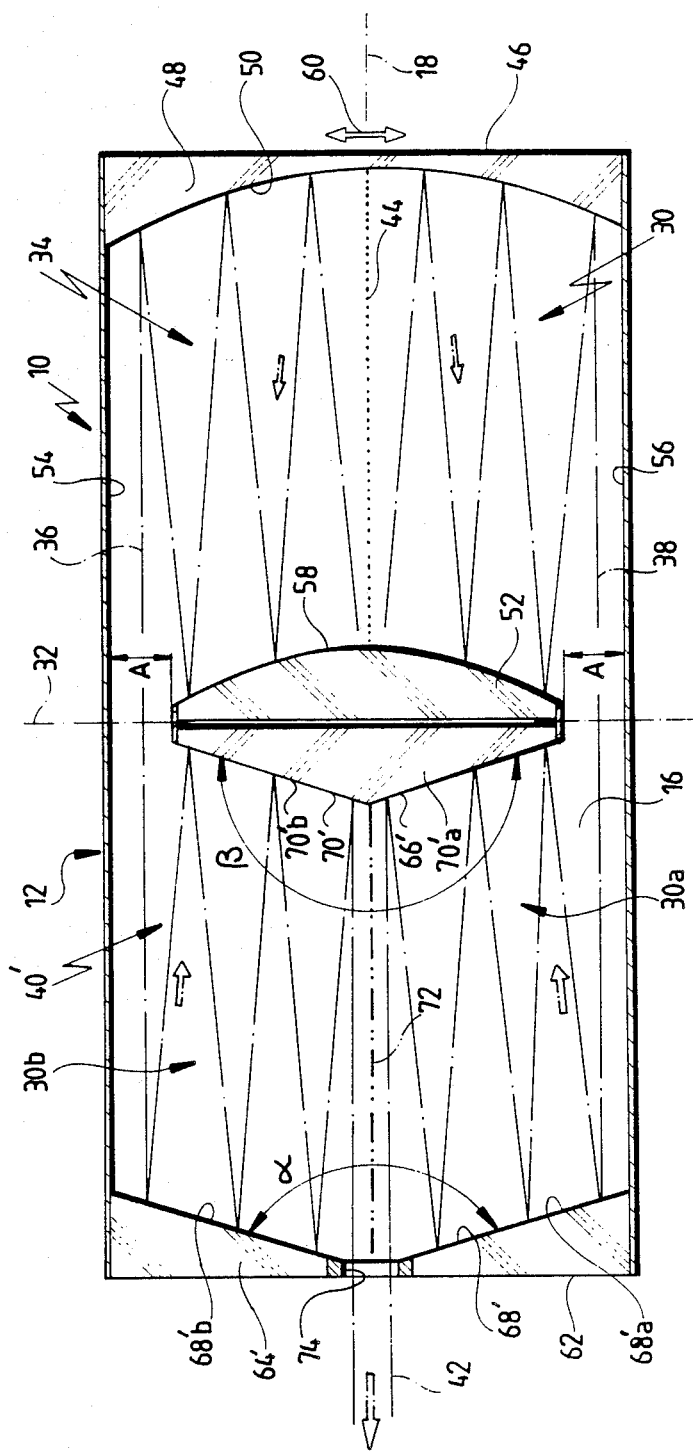
FIG. 4 is a section similar to FIG. 2 through a variation of the first embodiment.

In a variation of the first embodiment, illustrated in FIG. 4, those parts which are identical to the first embodiment have been given the same reference numerals and so reference may be made to the comments on the first embodiment with a view to their description.

In contrast to the first embodiment, the mirror surfaces 68' and 70' of the amplifier mirrors 64' and 66' are not curved but composed of two straight segments 68'a and 68'b as well as 70'a and 70'b. These segments intersect at the optical axis 72 and form with one another an angle $\alpha$ or $\beta$, $\alpha+\beta$ always being equal to 360°. In addition, the optical axis 72 always extends relative to the angles $\alpha$ and $\beta$ as an angle bisector, i.e. the mirror surfaces 68'a and 70'a as well as the mirror surfaces 68'b and 70'b are parallel to one another.

The laser beams 36 and 38 are reflected in the direction of the optical axis 72 in the same way as in the original first embodiment. In this case, however, the projection is not altered and, in particular, the width of the laser beams 36 and 38 is not reduced and so the amplifier laser beam 42' leaving the amplifier 40' has the same width as each of the laser beams 36 and 38 entering the amplifier 40' but double the intensity.

Figure 5:
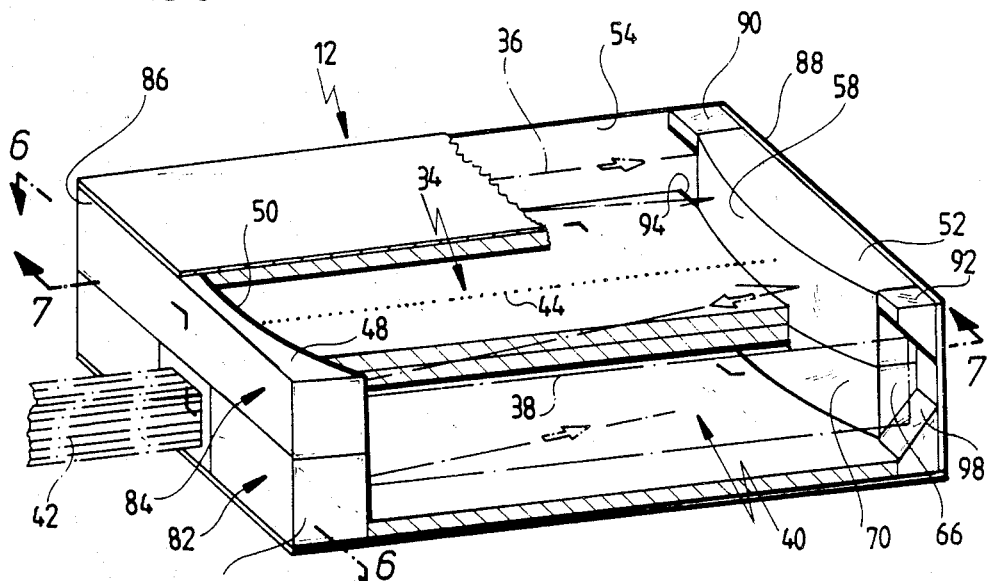
FIG. 5 is a perspective, partially opened view of a second embodiment.
Figure 6:
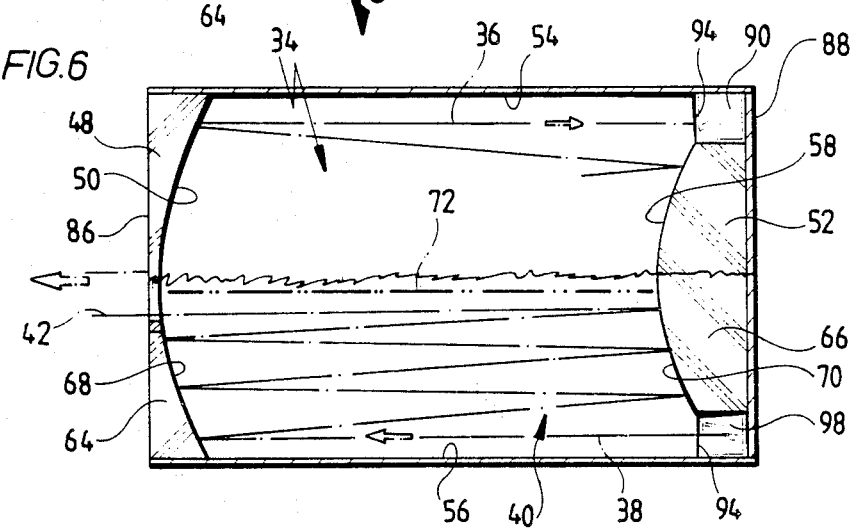
FIG. 6 is a section along line 5—5 in FIG. 4.
Figure 7:
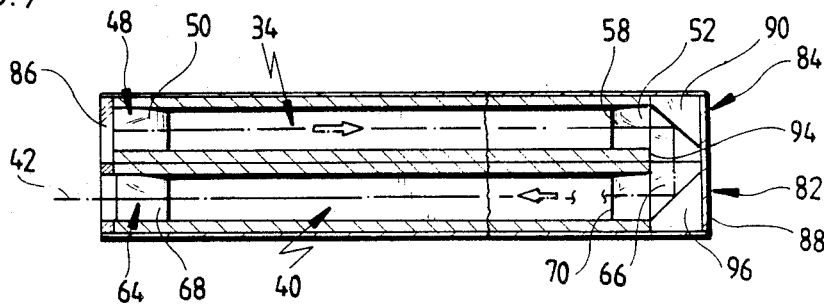
FIG. 7 is a section along line 6—6 in FIG. 4.

A second embodiment of the inventive laser, illustrated in FIGS. 5 to 7, is, insofar as it has the same parts as the first embodiment, given the same reference numerals and so reference can be made to the comments concerning the first embodiment with respect to their description.

In contrast to the first embodiment, the laser amplifier 40 and the resonator 34 are not arranged in the waveguide 12 one behind the other but in two superposed waveguide portions 82 and 84 of equal length. The resonator 34 is located in the upper waveguide portion 84 while the laser amplifier 40 is located in the lower waveguide portion 82.

With this arrangement it is now possible to arrange the concave laser mirror 48 above the concave amplifier mirror 64 and the convex laser mirror 52 above the convex amplifier mirror 66. This is of particular advantage when their mirror surfaces 50 and 68 as well as 58 and 70 have the same curvature since, in this case, the concave laser mirror 48 and the concave amplifier mirror 64 as well as the convex laser mirror 52 and the convex amplifier mirror 66 can be designed in one piece.

In the second embodiment, the concave laser mirror 48 is located at a front end 86 of the waveguide portion 84 and also extends over the entire width of this waveguide portion 84. This reflects towards the convex laser mirror 52 which is now located at a rear end 88 of the waveguide portion 84. In order to deflect the two laser beams 36 and 38 which extend along the side edges 54 and 56 into the laser amplifier 40 in the region of the convex laser mirror 52 right and left deflecting mirrors 90 and 92 are arranged on either side of the convex laser mirror 52. These deflecting mirrors deflect the laser beams 36 and 38 through openings 94 into the lower waveguide portion 82 in which they again impinge on left and right deflection mirrors 96 and 98, from which they are again deflected parallel to the optical axis 72 of the laser amplifier 40.

The resonator beam path and the amplifier beam path are identical to those of the first embodiment so that the amplifier laser beam 42 exits in the center of the lower waveguide portion 82 and coaxially to the optical axis 72 of the laser amplifier 40. The amplifier laser beam may again be expanded in the known manner to form a beam which is symmetrical on all sides.

Figure 8:
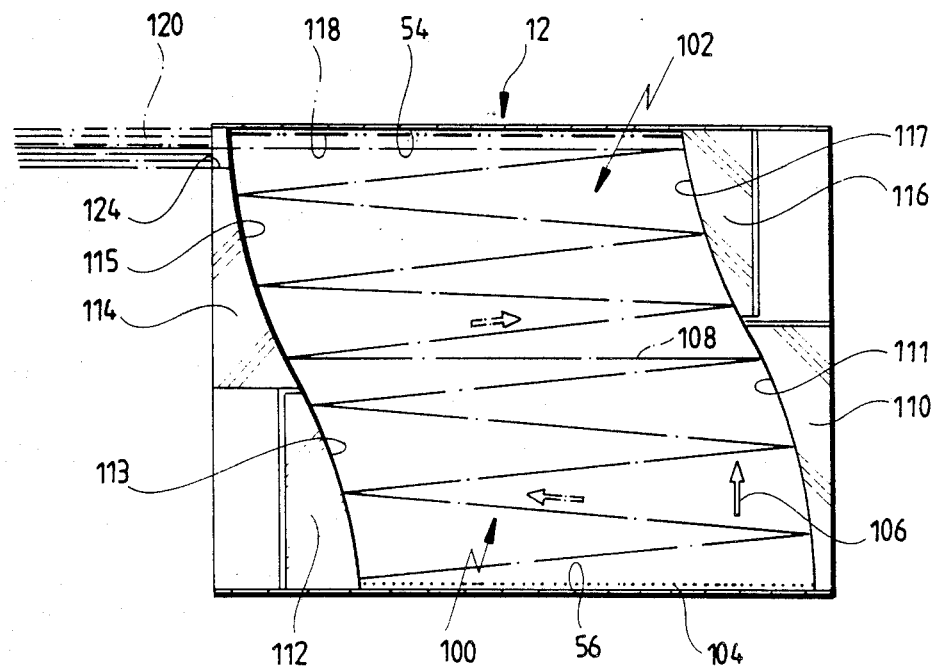
FIG. 8 is a section similar to FIG. 2 through a third embodiment.

A third embodiment, representing a simple version of the inventive laser system and illustrated in FIG. 8, is constructed in an identical manner to the first embodiment, as far as the design of the waveguide 12 is concerned, and so, in this respect, reference may be made to the first embodiment.

However, a resonator 100 and a laser amplifier 102 are arranged side by side in the waveguide 12 and extend together over the entire width of the waveguide 12 from the right-hand side edge 54 to the left-hand side edge 56.

This resonator 100 represents a "right-hand half" of the resonator 34 since a resonator axis 104 thereof extends along the side edge 56 of the waveguide 12. Starting from this resonator axis 104 the resonator beam path extends merely in a transverse direction 106 as far as a laser beam 108 leaving the resonator 100. A concave laser mirror 110 represents exactly half the concave laser mirror 48 and a convex laser mirror 112 half the convex laser mirror 52. A concave amplifier mirror 114 is disposed immediately adjacent to this convex laser mirror 112 and again represents half the concave amplifier mirror 64 while a convex amplifier mirror 116 which is located directly and laterally adjacent the concave laser mirror represents half the convex amplifier mirror 66. This means that an optical axis 118 of the laser amplifier 102 extends along the side edge 54 of the waveguide portion 12 and an exiting amplifier laser beam 120 extends from the optical axis 118 in the direction towards the resonator 100. Both the laser mirrors 110, 112 and the amplifier mirrors 114, 116 are confocal cylindrical mirrors having identical curved mirror surfaces 111, 113, 115, 117, exactly as in the first embodiment. The laser mirrors and the amplifier mirrors may be located immediately adjacent one another since the convex laser mirror 112 is narrower than the concave laser mirror 110 by a width A and, on the other hand, the concave amplifier mirror 114 is wider than the convex amplifier mirror 116 by this width A.

The third embodiment operates in such a manner that a laser beam generated in the resonator 100 migrates as far as the laser beam 108, whereby the laser beam 108 is reflected from the concave laser mirror 110 directly onto the concave amplifier mirror 114 located opposite thereto. This amplifier mirror again reflects the laser beam onto the convex amplifier mirror 116 so that the laser beam passes through the laser amplifier 102 in the transverse direction 122 as far as the optical axis 118 and exits from the laser amplifier 102 as an amplifier laser beam 120 through an opening 124 in the concave amplifier mirror 114. The beam can also be expanded to form a beam symmetrical on all sides by way of a cylindrical optical means described in conjunction with the first embodiment.

The present disclosure relates to the subject matter disclosed in German specification No. P 38 28 952.0 of Aug. 26, 1988, the entire specification of which is incorporated herein by reference.

What is claimed is:

1. An electrically excited, diffusion-cooled laser system comprising two wall surfaces slightly spaced from one another and forming an optical waveguide, the width of said wall surfaces being a multiple of the space between them and said surfaces enclosing between them a flow-free discharge chamber, and also comprising an optically unstable resonator having a resonator axis extending approximately parallel to said wall surfaces and having a resonator beam path travelling through at least part of said discharge chamber, said beam path extending generally along and transversely away from said resonator axis to a point at which said beam path exits from said resonator into a laser amplifier having an amplifier beam path that travels through an additional part of said discharge chamber whereby a surface area of said waveguide can be maximized without degrading beam quality.

2. Laser system as defined in claim 1, characterized in that said resonator beam path and said amplifier beam path together have an expansion in the transverse direction (60, 106) corresponding at the most to the width of the wall surfaces (14, 16).

3. Laser system as defined in claim 2, characterized in that said resonator beam path and said amplifier beam path are located completely within said discharge chamber (30).

4. Laser system as defined in claim 1, characterized in that said amplifier beam path has an expansion in the transverse direction (60, 106) extending transversely to the incoming laser beam (36, 38, 108) and approximately parallel to the wall surfaces (14, 16) of the waveguide (12).

5. Laser system as defined in claim 4, characterized in that said laser amplifier (40, 102) has an optical means (64, 66; 114, 116) continuously reflecting the laser beam (36, 38, 108) with a transverse component.

6. Laser system as defined in claim 5, characterized in that said optical means (64, 66; 114, 116) has an amplifier beam path similar to the beam path of an unstable resonator.

7. Laser system as defined in claim 1, characterized in that said resonator (34, 100) and said laser amplifier (40, 102) are arranged side by side.

8. Laser system as defined in claim 1, characterized in that said resonator (34) and said laser amplifier (40) are arranged in series in the longitudinal direction (18) of said waveguide (12).

9. Laser system as defined in claim 8, characterized in that said resonator beam path extends at the most over the width of said waveguide (12).

10. Laser system as defined in claim 8, characterized in that said amplifier beam path extends at the most over the width of said waveguide (12).

11. Laser system as defined in claim 1, characterized in that said laser amplifier (40, 102) has an optical axis (72, 118) extending parallel to the longitudinal direction (18) of said waveguide (12).

12. Laser system as defined in claim 11, characterized in that an amplifier laser beam (42, 120) exiting from said laser amplifier (40, 102) extends parallel to said optical axis (72, 118) of said laser amplifier (40, 102).

13. Laser system as defined in claim 1, characterized in that said laser amplifier (40, 102) has an optical axis (72, 118) arranged parallel to said resonator axis (44, 100).

14. Laser system as defined in claim 13, characterized in that said optical axis (72) of said laser amplifier (40) and said resonator axis (44) are arranged coaxially to one another.

15. Laser system as defined in claim 1, characterized in that said resonator (34, 100) is a confocal resonator.

16. Laser system as defined in claim 15, characterized in that said resonator beam path has outer beams (36, 38) extending parallel to one another.

17. Laser system as defined in claim 16, characterized in that said laser amplifier (40) is provided with an optical means (64, 66) combining two parallel laser beams (36, 38) to form a single amplifier laser beam (42).

18. Laser system as defined in claim 17, characterized in that said amplifier beam path comprises outer beams (36, 38) extending parallel to one another.

19. Laser system as defined in claim 1, characterized in that said resonator axis (44, 104) extends in the longitudinal direction (18) of said waveguide (12).

20. Laser system as defined in claim 1, characterized in that said resonator (34) is a resonator symmetrical to said resonator axis (44).

21. Laser system as defined in claim 1, characterized in that said laser amplifier (40, 102) comprises confocal mirrors (64, 66; 114, 116).

22. Laser system as defined in claim 1, characterized in that said laser amplifier (40') comprises mirrors (64', 66') having wedge-shaped mirror surfaces (68', 70').

23. Laser system as defined in claim 1, characterized in that said resonator (34, 100) and said laser amplifier (40, 102) comprise mirrors (48, 52; 110, 112; 64, 66; 114, 116) having identically curved mirror surfaces (50, 58; 68, 70; 111, 113; 115, 117).

24. Laser system as defined in claim 23, characterized in that said mirrors (48, 52; 110, 112) of said resonator (34, 100) have mirror surfaces (50, 58, 111, 113) extending at right angles to the wall surfaces (14, 16) contiguous thereto.

25. Laser system as defined in claim 23, characterized in that said mirrors (64, 66; 114, 116) of said laser amplifier (40, 102) have mirror surfaces (68, 70, 115, 117) extending at right angles to the wall surfaces (14, 16) contiguous thereto.

26. Laser system as defined in claim 25, characterized in that said mirrors (48, 52; 110, 112; 64, 66; 114, 116) of said resonator (34, 100) and said laser amplifier (40, 102) have cylindrical mirror surfaces (50, 58, 68, 70; 111, 113, 115, 117).

27. Laser system as defined in claim 1, characterized in that said mirrors (48, 52; 110, 112; 64, 66; 114, 116) of said resonator (34, 100) and said laser amplifier (40, 102) close said waveguide (12).

28. Laser system as defined in claim 1, characterized in that said waveguide (12) is a strip-like waveguide having straight wall surfaces (14, 16) extending transversely to the longitudinal direction.

29. Laser system as defined in claim 1, characterized in that said waveguide (12) is angled in the longitudinal direction.

30. Laser system as defined in claim 29, characterized in that said waveguide (12) comprises at least two waveguide portions (82, 84) and that one waveguide portion (84) accommodates the resonator (34) and the other (82) the laser amplifier (40).

31. Laser system as defined in claim 29, characterized in that at least one deflecting member (92, 94, 98) is provided between said waveguide portions (82, 84) extending in a straight line in the longitudinal direction.

32. Laser system as defined in claim 1, characterized in that the wall surfaces (14, 16) are made of metal.

33. Laser system as defined in claim 1, characterized in that said wall surfaces (14, 16) are produced from a dielectric and bear plate-like electrodes (24, 26) on their outer sides.

34. Laser system as defined in claim 1, characterized in that an amplifier laser beam (42) exiting from said laser amplifier (40) is expanded by a cylindrical optical means (76) to form a beam of rays symmetrical on all sides.

* * * * *